J. A. KNIGHT.
Drawing or Writing-Tables.
No. 5,993. Reissued July 28, 1874.
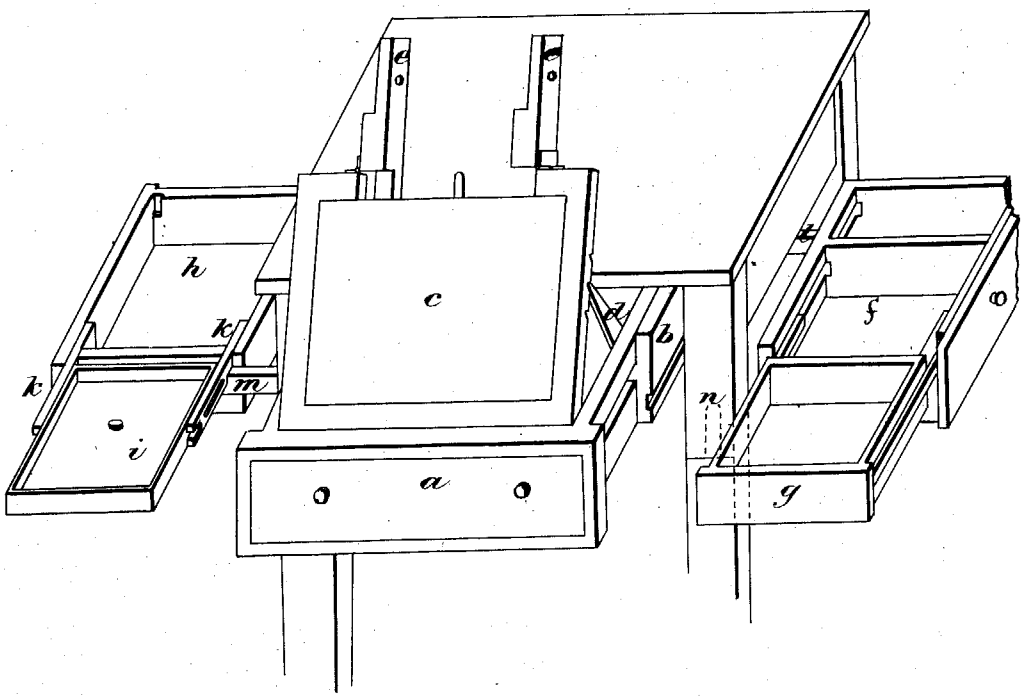
Witnesses.
C. F. Brown
M. Church
Inventor.
J. A. Knight.
by his Attys.
Hill & Ellsworth

UNITED STATES PATENT OFFICE.

JOHN A. KNIGHT, OF AUBURN, MAINE.

IMPROVEMENT IN DRAWING OR WRITING TABLES.

Specification forming part of Letters Patent No. 147,504, dated February 17, 1874; reissue No. 5,993, dated July 28, 1874; application filed June 24, 1874.

*To all whom it may concern:*

Be it known that I, JOHN ADAMS KNIGHT, of Auburn, in the county of Androscoggin and State of Maine, have invented certain new and useful Improvements in Tables, of which the following is a specification:

My invention relates to improvements in drawing or writing tables, hereinafter more fully set forth.

To enable others skilled in the arts to which it appertains to make and use my invention, I will proceed to describe its construction and operation with reference to the drawing, which represents a table made with the said improvements.

The drawer *a* has a supplementary slide, *b*, on each side, that admits of its being drawn out its full length, although it extends the width of the table. The desk-cover *c* is hinged at the front of the drawer, that its inclination may be altered to any required degree, either by resting on the edge of the table or on the prop *d*. The upper part of the frame of the lid may be hinged, as at *e*, to support a large picture, as an easel. The end drawer *f* has a drawer, *g*, working on extension-slides from its side; and the end drawer *h* has a shallow tray, *i*, carried on the arms *k*, that are pivoted at the end within the drawer, so that as the arms are swung over and into the drawer the tray may also be placed within it by the sliding of pins on each side of the tray in the grooves or slots of the arms. By these pins and slots the tray is also held steadily when extended. The end drawers *f* and *h* are opposite and in the same plane; but by arranging the slides of *f*, as at *l*, on the lower parts of the slides of the drawer, and that of *h* on the upper part, as at *m*, both drawers may work on extension-slides without interference with one another.

For convenience of packing, I make the legs of the table in sections, which may be unscrewed or otherwise detached, as indicated by the dotted lines at *n*.

I claim as my invention—

1. The drawer *a*, provided with a hinged adjustable inner lid, *c*, and supplemental slides *b b*, substantially as described, and for the purpose set forth.

2. The combination, with the drawer *a*, provided with a hinged adjustable inner lid, *c*, and supplemental slides *b b*, of the folding arms *e*, substantially as described, and for the purposes set forth.

3. As an article of furniture, a table provided with a drawer, *a*, slides *b*, cover *c*, props *d*, hinged parts *e*, drawer *f*, inner drawer *g*, slides *l*, drawer *h*, tray *i*, arms *k*, and slides *m*, all arranged, constructed, and operating substantially as described.

JOHN ADAMS KNIGHT.

Witnesses:
MELVILLE CHURCH,
WILLIAM READ.